United States Patent [19]

Senju

[11] Patent Number: 4,574,483
[45] Date of Patent: Mar. 11, 1986

[54] MEASUREMENT OF DEGREE OF OFFSET OF ATTACHMENT POSITION OF DRAFTING PEN IN COORDINATE PLOTTER

[75] Inventor: Tsutomu Senju, Osaka, Japan
[73] Assignee: Dainippon Screen Mfg. Co., Japan
[21] Appl. No.: 725,091
[22] Filed: Apr. 19, 1985
[51] Int. Cl.$^4$ ............................................. G01D 15/16
[52] U.S. Cl. ...................... 33/18.1; 33/1 B; 33/40
[58] Field of Search ............ 33/18 R, 1 B, 1 D, 19 A, 33/23 G, 32 C, 40, 44

[56] References Cited

U.S. PATENT DOCUMENTS 4,157,552  6/1979  Nakajima ............................ 33/18 R
4,475,288  10/1984 Pellegrom ........................... 33/1 B

FOREIGN PATENT DOCUMENTS 612500  7/1979  Switzerland ........................ 33/1 D Primary Examiner—Willis Little
Attorney, Agent, or Firm—Ostrolenk, Faber, Gerb & Soffen

[57] ABSTRACT

The offset of the attachment position of each drafting pen in a coordinate plotter can be measured by drawing, with a standard drafting pen different from the first-mentioned plural drafting pen, main scale line segments dividing a predetermined distance from a reference line equally into n divisions; drawing, from the position of the reference line and with the first-mentioned drafting pen, auxiliary scale line segments dividing the predetermined distance equally into n+1 divisions while causing the auxiliary scale line segments to overlap partly with the main scale line segments; and determining a position, where either one of the main scale line segments is coincided with either one of the auxiliary scale line segments. The method of this invention thus allows to adjust the offsets of drafting pens readily and accurately in a coordinate plotter.

1 Claim, 7 Drawing Figures

MEASUREMENT OF DEGREE OF OFFSET OF ATTACHMENT POSITION OF DRAFTING PEN IN COORDINATE PLOTTER

This invention relates to a method for measuring the offset of the attachment position of a drafting pen in a coordinate plotter in which a plurality of drafting pens are employed.

Drafting devices called plotters or coordinate plotters have conventionally been adapted to draft design drawings, industrial designs, survey maps, three-dimensional topographical maps and the like on drawing paper by shifting drafting heads equipped with drafting pens in X- and Y-directions.

When drafting a multi-colored drawing or drafting a drawing by using lines of several different thicknesses chosen, a desired drafting pen a is first of all chosen by an arm b from a plurality of drafting pens a,a' provided in advance as shown in FIG. 6. After drawing with the drafting pen a by shifting a head c in both X- and Y-directions, the drafting pen a' is then chosen to draft a drawing in the same manner.

When using the drafting pens a,a' interchangeably in the above-described manner, the position of the tip of one drafting pen or its attachment position to the arm b is however different slightly from that of the other drafting pen. Even if the head c is set at the same coordinate point for example relative to the X-axis, the central position of a line drawn by one of the drafting pens is therefore at t-s provided that that of a line drawn by the other drafting pen is supposed to be apart by a distance t from the center o of the head. Accordingly, the central positions are offset by the offset between the two drafting pens, namely, the offset s.

For the correction of such offset, it is necessary to store offset-correcting control data in a head-driving CAD system or the like. However, this offset s is usually very small, for example, as small as one severals of the width of a drawn line. Its accurate measurement has therefore been difficult.

As a measurement method for such an offset, measurement has conventionally been conducted by replacing drafting pens from one to another to draw lines while maintaining a head at the same position and then visually observing the offsets of individual lines drawn respectively by the drafting pens or measuring such offsets using a microscope or as illustrated by way of example in FIG. 7, using a loupe f with graduations e.

In order to measure an offset in the above case, it is necessary to measure the distance between the centers of two lines g,h for example. This distance is however too small to permit its accurate measurement.

The above method is accompanied by such additional drawbacks that experiences accumulated over a long period of time are indispensable for measurement and lots of time is required for the correction of such offset.

An object of this invention is to permit easy and accurate measurement of offsets by applying the relationship between a main scale and its corresponding auxiliary scale in the art of measurement, namely, the principle of vernier to the measurement method of the offset of attachment position of a drafting pen in a coordinate plotter.

In one aspect of this invention, there is thus provided a method for measuring the offset of the attachment position of one of plural drafting pens in a coordinate plotter in which the plural drafting pens are replaceably attached to a drafting head movable relative to drawing paper, which comprises drawing, with a drafting pen which has been chosen as a standard from the plural drafting pens and is different from said one of the plural drafting pens, main scale line segments dividing a predetermined distance from a reference line equally into n divisions;

drawing, from the position of the reference line and with said one of the plural drafting pen, auxiliary scale line segments dividing the predetermined distance equally into n±1 divisions while causing the auxiliary scale line segments to overlap partly with the main scale line segments; and counting a position, where either one of the main scale line segments is coincided with either one of the auxiliary scale line segments, in terms of the number of the main scale line segments or auxiliary scale line segments from the reference line, thereby to detect the relative offset between the drafting pen chosen as the standard and said one of the plural drafting pens.

The present invention will hereinafter be described in detail with reference to FIG. 1 to FIG. 5. Since the coordinate plotter employed in the following embodiment is of a conventionally-known structure, its description will thus be limited.

It is therefore possible to have the coordinate values of the origin of each drafting pen coincided with those of a reference origin on the basis of such measurement data. The method of this invention thus allows to adjust the offsets of drafting pens readily and accurately in a coordinate plotter. Even when drafting pens are interchanged in an automated fashion, there is no danger of developing oine offset, color offset or the like.

The above and other objects, features and advantages of this invention will become apparent from the following description and the appended claims, taken in conjunction with the accompanying drawings, in which:

The present invention will hereinafter be described in detail with reference to FIG. 1 to FIG. 5. Sincent he coordinate plotter employed in the following embodiment is of a conventionally-known structure, its description iwllthus be limited.

Figure 1:
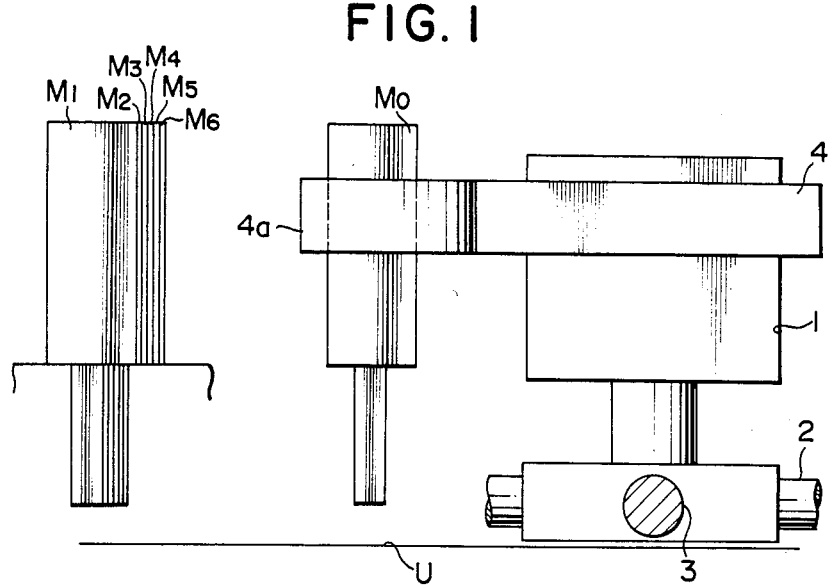
FIG. 1 is a schematic front elevation of a drafting head for drafting pens, which is suitable for use in the practice of this invention.

In FIG. 1, numeral 1 indicates a drafting head for holding drafting pens thereon in the coordinate plotter. The drafting head 1 is supported, in a horizontal plane, movably relative to shafts 2,3 which are supported on a frame (not shown) and extend in the X-direction and Y-direction respectively. The drafting head 1 is automatically shifted in the X- and Y-directions by means of an unillustrated drive unit and under the control of an unillustrated computer.

The drafting head 1 is equipped with a horizontal arm 4, which terminates in a bifurcated drafting pen holder 4a whereby to hold the base of a drafting pen $M_0$ upright. The holder 4a is also capable of releasing the drafting pen $M_0$ for its replacement by another drafting pen.

Besides the drafting pen $M_0$, there are also provided drafting pens $M_1$, $M_2$, $M_3$, ... which are of the same shape as the drafting pen $M_0$ but are adapted to draw lines of different colors or different widths. By using these drafting pens $M_0$, $M_1$, $M_2$, ... one after another, it is possible to draw lines of different colors or widths on drawing paper U.

Figure 2:
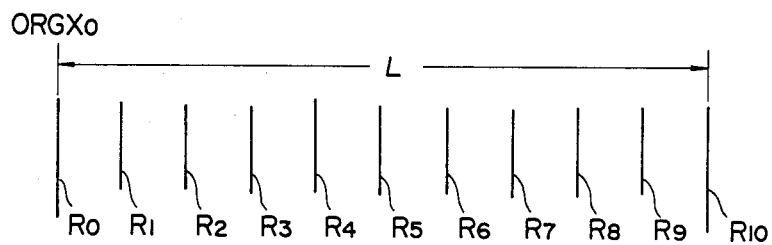
FIGS. 2 and 3 are diagrams describing the principle of measurement according to this invention.
Figure 3:
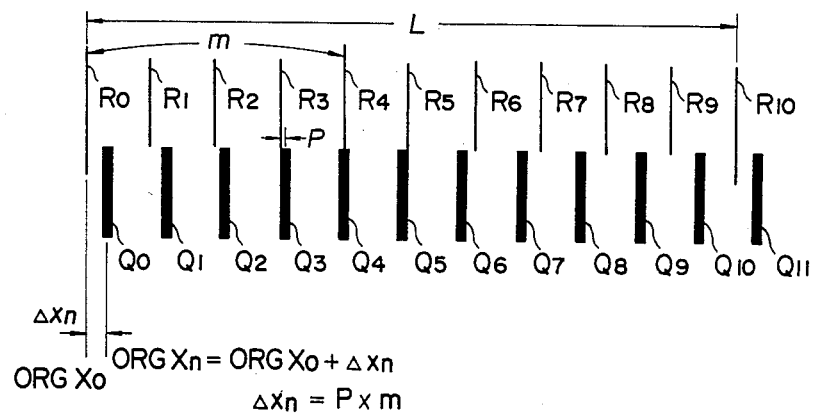

FIGS. 2 and 3 illustrate a measurement method for offsets of attachment positions of drafting pens. First of all, a reference line $R_0$ is drawn through the origin $ORGX_0$ of the X coordinate by means of the drafting pen $M_0$ which serves as a standard. Then, main scale line segments $R_1$, $R_2$, ... are drawn from the reference line $R_0$ at a pitch obtained by equally dividing a predetermined distance L into n divisions (in the illustrated embodiment, 10 equal divisions).

Thereafter, with another drafting pen $M_X$ the offset of which is to be measured, auxiliary scale line segments $Q_0$, $Q_1$, $Q_2$, ... are drawn from the point $ORGX_0$ at a pitch obtained by equally dividing the predetermined distance L into n±1 divisions (in the illustrated embodiment, 11 equal divisions). The auxiliary scale line segments $Q_0$, $Q_1$, $Q_2$, ... are drawn in such a way that they overlap partly with the main scale line segments $R_1$, $R_2$, ... in the Y-direction or otherwise no substantial gap is produced in the Y-direction therebetween. In the illustrated embodiment, the pitch interval between the main scale line segments and the auxiliary scale line segments is set at P.

Then, detection is made as to a position where either one of the main scale line segments $R_1$, $R_2$, ... coincides with either one of the auxiliary scale line segments $Q_1$, $Q_2$, $Q_3$, ...

In FIG. 3, the main scale line segment $R_4$ and the auxiliary scale line segment $Q_4$ coincide with each other at the $m_{th}$ line segments (at the 4th graduations in the illustrated embodiment) from the reference line $R_0$. Supposing that the offset be $\Delta x_n$, $\Delta x_n = P$ (pitch interval)$\times$m. Supposing on the other other that the coordinate value of the origin of the drafting pen ($M_X$) to be measured be $ORGX_n$, the following relationship can be established.

$$ORGX_n = ORGX_0 + \Delta x_n$$

Assuming L=11 mm, n=10, p=0.1 mm and m=4 for example, the offset can be expressed as follow:

$$\text{Offset } (\Delta x_n) = 0.1 \times 4 = 0.4 \text{ mm}$$

In the above manner, it is possible to determine the relative offset between the standard drafting pen and another drafting pen.

In the above embodiment, n graduations are given along the main scale while (n+1) graduations are placed along the auxiliary scale. Alternatively, (n−1) graduations may be provided along the auxiliary scale.

Figure 4:
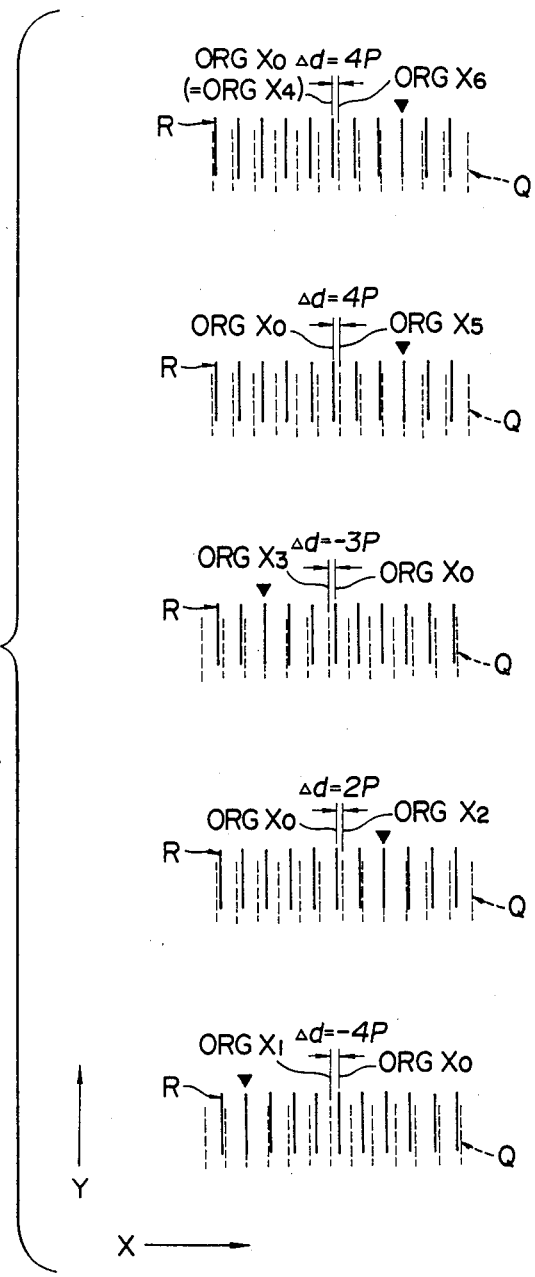
FIGS. 4 and 5 are diagrams showing various patterns for the description of one embodiment of this invention.

FIGS. 4($X_1$) through 4($X_6$) illustrate patterns when in a coordinate plotter equipped with 6 drafting pens $M_1$–$M_6$, the present invention was applied to measure the relative differences, i.e., offsets ($\Delta d$) of the respective drafting pens along the X-axis.

In this embodiment, the main scale line segment R drawn by the standard drafting pen $M_4$ is shown by a solid line segment while the auxiliary scale line segments Q drawn respectively by the drafting pens $M_1$, $M_2$, $M_3$, $M_5$, $M_6$ are all shown by broken line segments.

By counting the positions where the main scale line segments R and the auxiliary scale line segments Q are coincided, namely, the positions indicated by as $m_{th}$ line segments from the origin ($ORGX_0 = ORGX_4$) as mentioned above, the offsets ($\Delta d$) of the origins ($ORGX_1$–$ORGX_6$) of the respective drafting pens $M_1$–$M_6$ can thus be determined to be m×p (i.e., $\Delta d = m \times p$) wherein p means the pitch interval between each main scale line segment R and its corresponding auxiliary scale line segment Q.

Figure 5:
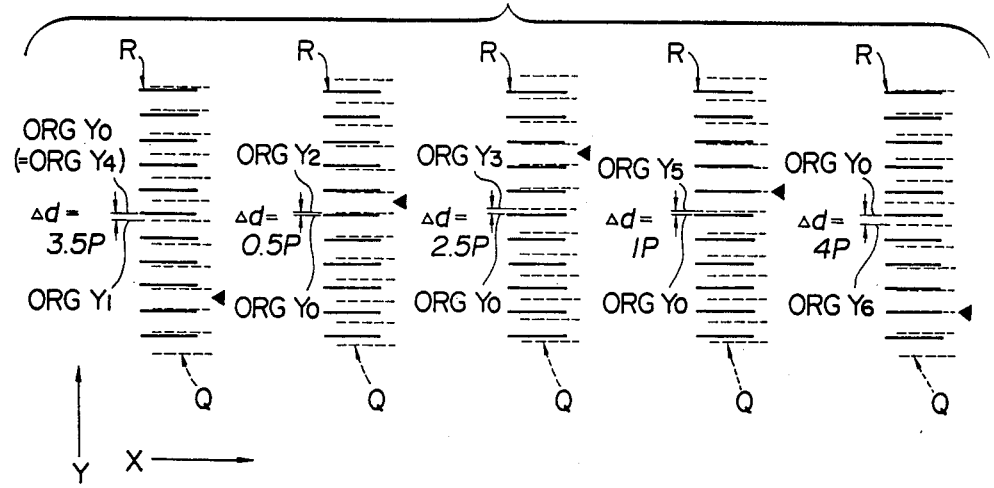
Figure 6:
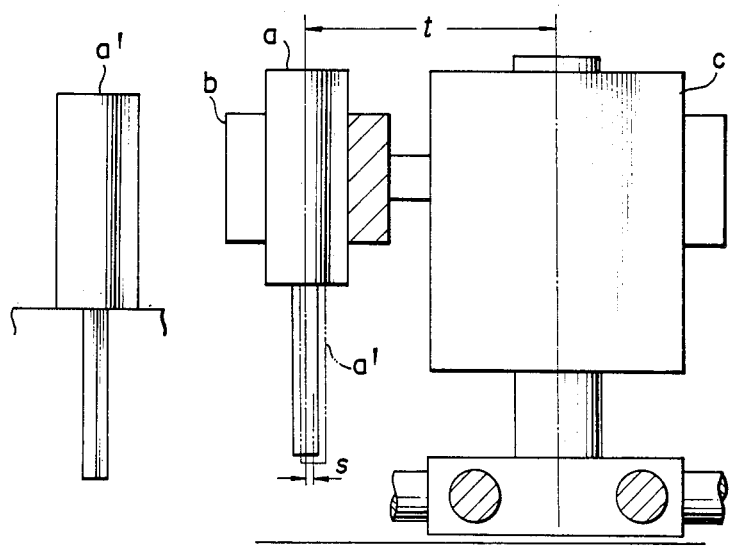
FIG. 6 is a schematic front elevation of a conventional coordinate plotter.
Figure 7:
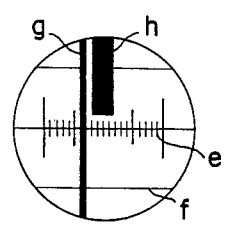
FIG. 7 is a schematic top plan view illustrating a conventional measurement method of offset.

FIGS. 5($Y_1$) through 5($Y_6$) illustrate patterns when the relative differences, i.e., offsets ($\Delta d$) of the respective pens shown in FIG. 4 are measured along the Y-axis.

Similar to FIG. 4, main scale line segments R of the standard drafting pen $M_4$ the origin of which is assumed to be $ORGY_0$ (=$ORGY_4$) are shown by solid line segments, whereas the auxiliary scale line segments Q of the individual drafting pens $M_1$, $M_2$, $M_3$, $M_5$, $M_6$ are indicated by broken line segments.

The offsets ($\Delta d$) of the respective origins $ORGY_1$–$ORGY_6$ along the Y-axis are thus determined to be m×p (i.e., d=m×p).

After determining the offsets ($\Delta d$) of the individual drafting pens $M_1$, $M_2$, $M_3$, $M_5$, $M_6$ relative to the standard drafting pen $M_4$ along the X- and Y-axes, these offsets ($\Delta d$) are input as correction data to the control program of the drafting head 1.

After the correction, drafting work can be initiated with drawn lines coincided without offset no manner which drafting pens $M_1$–$M_6$ are chosen by the arm 4, because the coordinate values $ORGX_1$–$ORGX_6$, $ORGY_1$–$ORGY_6$ of the individual drafting pens have been kept coincided with the coordinate values $ORGX_0$, $ORGY_0$ of the origin as the reference point.

After the correction, drafting work can be initiated with drawn lines coincided without offset no manner which drafting pens $M_1$–$M_6$ are chosen by the arm 4, because the coordinate values $ORGX_1$–$ORGX_6$, $ORGY_1$–$ORGY_6$ of the individual drafting pens have been kept coincided with the coordinate values $ORGX_0$, $ORGY_0$ of the origin as the reference point.

Having now fully described the invention, it will be apparent to one of ordinary skill in the art that many changes and modifications can be made thereto without departing from the spirit or scope of this invention as set forth herein.

I claim:

1. A method for measuring the offset of the attachment position of one of plural drafting pens in a coordinate plotter in which the plural drafting pens are replaceably attached to a drafting head movable relative to drawing paper, which comprises:

drawing, with a drafting pen which has been chosen as a standard from the plural drafting pens and is different from said one of the plural drafting pens, main scale line segments dividing a predetermined distance from a reference line equally into +n divisions;

drawing, from the position of the reference line and with said one of the plural drafting pen, auxiliary scale line segments dividing the predetermined distance equally into n±1 divisions while causing the auxiliary scale line segments to overlap partly with the main scale line segments; and counting a position, where either one of the main scale line segments is coincided with either one of the auxiliary scale line segments, in terms of the number of the main scale line segments or auxiliary scale line segments from the reference line, thereby to detect the relative offset between the drafting pen chosen as the standard and said one of the plural drafting pens.

* * * * *